United States Patent [19]

Ewing et al.

[11] Patent Number: 5,280,880

[45] Date of Patent: Jan. 25, 1994

[54] UNITARY HOIST DRUM FOR HOIST ROPES AND AN ELECTRIC CABLE

[75] Inventors: David A. Ewing; Vernon C. Dotson, both of Houston, Tex.

[73] Assignee: Kone Oy, Helsinki, Finland

[21] Appl. No.: 732,285

[22] Filed: Jul. 18, 1991

[51] Int. Cl.⁵ .................... B66B 11/04; H02G 11/00; B66D 1/14
[52] U.S. Cl. .................................. 254/294; 187/27; 191/12.2 R
[58] Field of Search ............... 242/117; 254/278, 294; 187/27; 191/12.2 R, 12.2 A, 12.4

[56] References Cited

U.S. PATENT DOCUMENTS

| | | | |
|---|---|---|---|
| 322,515 | 7/1885 | Young | 242/117 |
| 873,781 | 12/1907 | Pirtle | 191/12.2 A |
| 1,476,941 | 12/1923 | Young et al. | 191/12.2 A |
| 3,430,179 | 2/1969 | Shoji | 191/12.2 R |
| 4,008,791 | 2/1977 | Shafii-Kahany et al. | 191/12.2 R |

FOREIGN PATENT DOCUMENTS 278678  5/1990  German Democratic Rep. ................. 191/12.2 A Primary Examiner—John M. Jillions
Assistant Examiner—Michael R. Mansen
Attorney, Agent, or Firm—Sughrue, Mion, Zinn, Macpeak and Seas

[57] ABSTRACT

A hoisting system is disclosed which includes a hoisting drum around which two hoisting ropes are wound in respective hoist rope grooves. The hoisting ropes are secured to the hoisting drum at one end, and extend down to a suspended device, such as an elevator, or a crane hook. The hoisting drum also includes a cable groove, which is located between the two hoist rope grooves. An electrical cable is secured at one end to the hoist drum, is wound around the hoist drum in the cable groove, and extends down to the suspended device. A slip-ring assembly establishes an electrical connection to the cable, so as to permit power to be supplied to the suspended device.

8 Claims, 5 Drawing Sheets

UNITARY HOIST DRUM FOR HOIST ROPES AND AN ELECTRIC CABLE

FIELD OF THE INVENTION

The present invention relates to hoisting systems in which one or more hoist ropes are wound about a hoisting drum which is rotated to raise and lower a suspended device, and in particular to a hoisting system which comprises means for providing an electrical connection with the suspended device.

DESCRIPTION OF THE PRIOR ART

Hoisting systems (for example cranes and elevators) which comprise a device suspended on hoist ropes are well known in the art. In many of these systems, the suspended device (i.e. the elevator car, or a crane lifting device) requires an electrical connection to the rest of the hoisting system. This electrical connection is used, for example, to provide power for lights or user control inputs.

In one method employed for providing an electrical connection, the electrical cable is simply suspended from a fixed attachment point located near the hoisting machinery. The cable is allowed to hang down to the suspended device. When the suspended device is raised by the hoisting machinery, the electrical cable is nested on top of the suspended device. In some cases, a basket or other collecting means is used to prevent the nesting cable from falling off the suspended device.

This method has the advantage that it is inexpensive. However, the top of the cable tends to be subjected to substantial tensile stresses due to the weight of the suspended cable, particularly when the length of suspended cable is large. As the cable nests on top of the suspended device, the loops of the cable rub against one another, thereby causing wear of the cable jacket. The high tensile stresses, coupled with high wear, reduces the service life of the cable. Additionally, the cable nesting on top of the suspended device can interfere with the suspended device. For example, if the cable nests unevenly, the uneven weight distribution will tend to subject the suspended device to an un-balanced force. Finally, a danger exists of a loop of the nesting cable falling out of the nesting basket and interfering with the operation of the suspended device.

Another solution involves winding the cable onto a drum in a manner similar to that used for the hoisting ropes. The cable drum may be provided with its own motor drive, or be coupled to the hoist motor via gears and/or other coupling devices.

A separate cable drum facilitates an electrical connection to the suspended device while minimizing interference with the suspended device. The cable is also subjected to very little abrasion, and therefore does not wear as rapidly as when the cable is nested. In addition, by minimizing the length of suspended cable, the stress on the cable (particularly at the attachment point) is greatly reduced. The reduced tensile stresses and wear tend to increase the service life of the cable. However, in order to minimize the flexural stresses in the cable, the diameter of the cable drum must be at least approximately 20 times the cable diameter. This means that the cable drum, and its associated drive system, tends to occupy a large amount of space. In addition, the provision of a separate cable drum, along with its associated drive and support systems, results in this solution being relatively expensive.

BRIEF SUMMARY OF THE INVENTION

It is therefore an object of the invention to provide an improved means for providing an electrical cable connection to a suspended device.

It is another object of the invention to provide a means for providing an electrical connection to a suspended device, which means can be installed on existing hoisting equipment as a retrofit.

According to the invention there is provided a hoisting system for raising and lowering a suspended device, said hoisting system comprising: a hoist drum comprising two hoist rope grooves located at opposite ends of said hoist drum, and further comprising an electrical cable groove located between said hoist rope grooves; respective hoisting ropes at least partially disposed in said hoist rope grooves, one end of said hoist ropes being secured to said hoist drum, the other end of said hoist ropes extending down to and supporting said suspended device; an electrical cable at least partially disposed in said electrical cable groove, said electrical cable being secured to said hoist drum near one end of the electrical cable, said electrical cable extending down to said suspended device, so as to establish an electrical connection thereto; a drive shaft coupled to one end of said hoist drum and to driving means to rotate said hoist drum in respective directions to raise and lower said suspended device, said drive shaft being further adapted to support said one end of said hoist drum; a hollow shaft disposed at the other end of said hoist drum, said hollow shaft being adapted to support said other end of said hoist drum; electrical cable guide means disposed within said hoist drum and communicating with said cable groove and said hollow shaft, whereby the portion of said electrical cable extending through said cable guide and said hollow shaft is supported and substantially protected against abrasion and mechanical stress; and coupling means disposed proximal to the open end of said hollow shaft for maintaining an electrical connection with said electrical cable substantially without interfering with rotation of the electrical cable with said hoist drum.

The fixed end of the cable is firmly attached to the hoisting drum, to securely support the weight of the cable when it is fully reeled out. The cable then passes through the shell of the drum, the cable guiding means, and terminates in the slip-ring assembly. Seals can be provided as required to reduce the entry of water and/or other contaminants into the interior of the hoisting drum and the slip-ring assembly. The slip-ring assembly facilitates continuous rotating electrical contact between the cable and other associated equipment. The free end of the cable terminates in a distribution unit on the suspended device. A compensation device is attached between the suspended device and a point near the free end of the cable. By this means a comparatively short length of slack cable is maintained in the vicinity of the suspended device, which prevents loads from being transmitted to the electrical connections in the distribution unit.

The portion of the cable near the suspended device can be provided with shielding to provide protection against heat or other hostile environmental factors.

In one embodiment of the invention, the hollow shaft of the hoisting drum is fixed to (and therefore rotates with) the hoisting drum. In this case the cable guiding means simply guides the cable into the interior of the hollow shaft.

In another embodiment of the invention, the hollow shaft of the hoisting drum is fixed to the support frame, and thus does not rotate with the hoisting drum. In this case, the guiding means comprises a tube which passes through the hollow shaft to the slip-ring assembly. Bearings between the hollow shaft and the tube maintain the tube centered within the hollow shaft and reduces friction. The tube rotates the slip-rings. This embodiment permits the slip-ring assembly to be lighter and smaller.

The cable groove can be fabricated directly on the surface of the hoisting drum, or can be fabricated on a separate cylindrical shell which is then mounted concentrically with the hoisting drum and fixed thereto. The separate cylindrical shell can be constructed so as to have substantially the same diameter as the hoisting drum, or alternatively can be made with a substantially different diameter. By this means, variations in the diameter of the cable may be compensated for. In addition, fabrication of the cable groove on a separate shell may reduce the manufacturing cost.

The base of the cable groove can be either rounded (like the hoisting rope grooves) or rectangular in cross section.

In a conventional hoisting rope drum, the hoisting cables are wound in respective grooves located at opposite ends of the hoisting rope drum. An empty region is located on the hoisting rope drum between the two grooves. This configuration is employed to ensure that sufficient angle between the hoisting ropes is maintained to provide adequate damping of swinging motion of the suspended device. In the hoisting drum according to the invention, the cable groove is disposed within the empty region between the conventionally disposed hoisting rope grooves. Thus the hoisting drum according to the invention has the same length as a conventional hoisting rope drum, and can therefore be mounted on a conventional hoisting rope drum frame. Similarly, a conventional hoisting rope drive system may also be used. Thus a hoisting system according to the invention can be installed as a retrofit to existing conventional hoisting systems.

The hoisting drum according to the invention permits the functions of two separate drum systems to be combined into one unit. This reduces the space requirements of the hoisting system, as well as the equipment costs.

BRIEF DESCRIPTION OF THE DRAWINGS

Further objects, features and advantages of the present invention will become apparent in the following detailed description, with reference to the appended drawings in which.

DETAILED DESCRIPTION OF THE PREFERRED EMBODIMENTS

Figure 1:
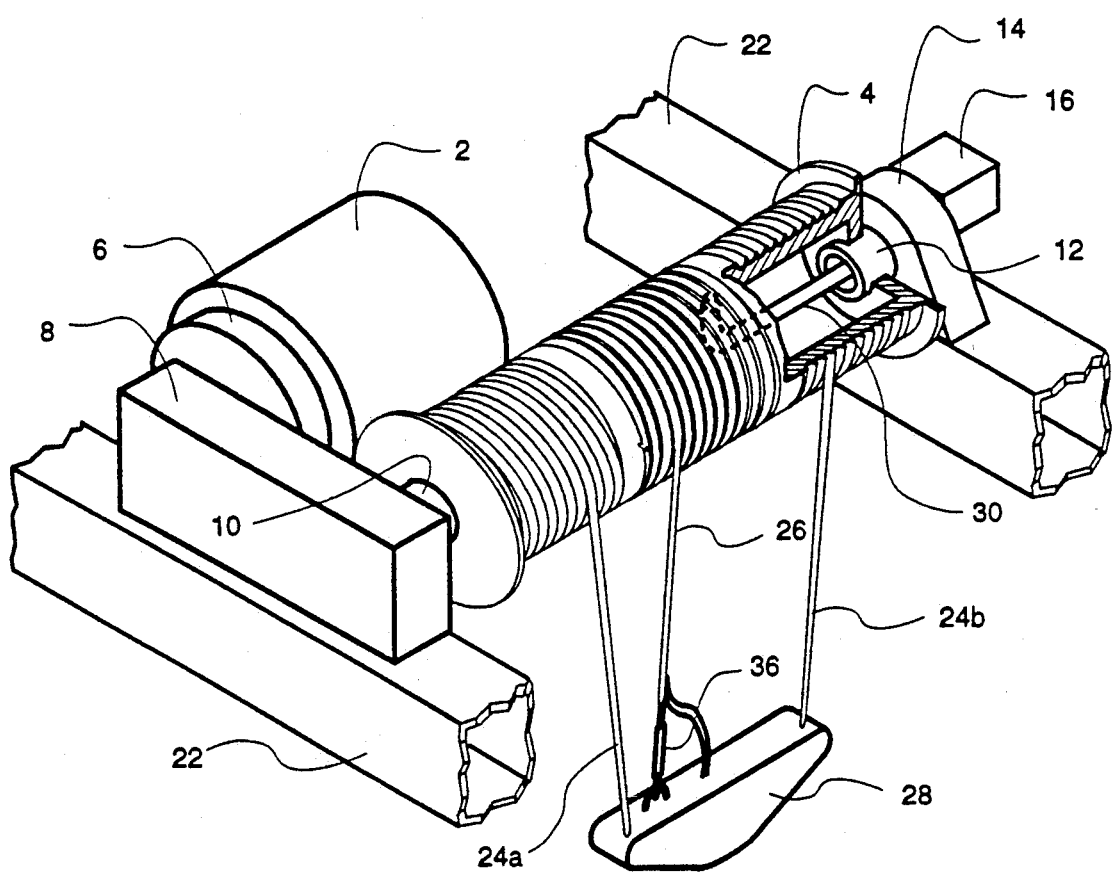
FIG. 1 is a perspective view diagrammatically illustrating the general arrangement of elements in a hoisting system according to the invention.

FIG. 1 illustrates the general arrangement of elements in a hoisting system 1 according to the invention. A hoist motor 2 drives the hoist drum 4 via a brake mechanism 6, a gear box 8, and a drive shaft 10. The opposite end of the hoist drum 4 is supported by a hollow shaft 12 which is mounted in a mounting block 14. A slip-ring assembly 16 is located near the open end of the hollow shaft 12, distal to the hoisting drum 4. Disposed on the hoist drum 4, are two hoist rope grooves 18a and 18b, an a cable groove 20. The hoist rope grooves 18a and 18b, as well as the cable groove 20, comprise continuous helical paths formed on the hoist drum 4 so as to smoothly guide the ropes 24a and 24b and the cable 26 onto the hoist drum as the hoist system 1 raises the suspended device 28. The entire assembly is operatively mounted on a support structure, referred to generally by reference numeral 22.

The hoist ropes 24a, 24b and the cable 26 are secured to the hoist drum 4, are wound around the hoist drum 4 (in their respective grooves), and extend down to the suspended device 28. The hoist ropes 24a, 24b are attached to the suspended device in a conventional manner. The cable 26 terminates, for example, at a distribution unit (not show), which is mounted on the suspended device for distributing the power supplied by the cable (for example, to a variety of lights). A compensation device 36 is attached between the suspended device 28 and the cable 26 at a point near the suspended device. The compensation device, which can comprise a spring or elastomeric cord, maintains a tension load in the cable above the compensation device 36. By this means a section of slack cable 26a can be maintained between the compensation device 36 and the suspended device 28, so as to prevent the transmission of forces to the distribution unit on the suspended device 28, from the cable.

Figure 2:
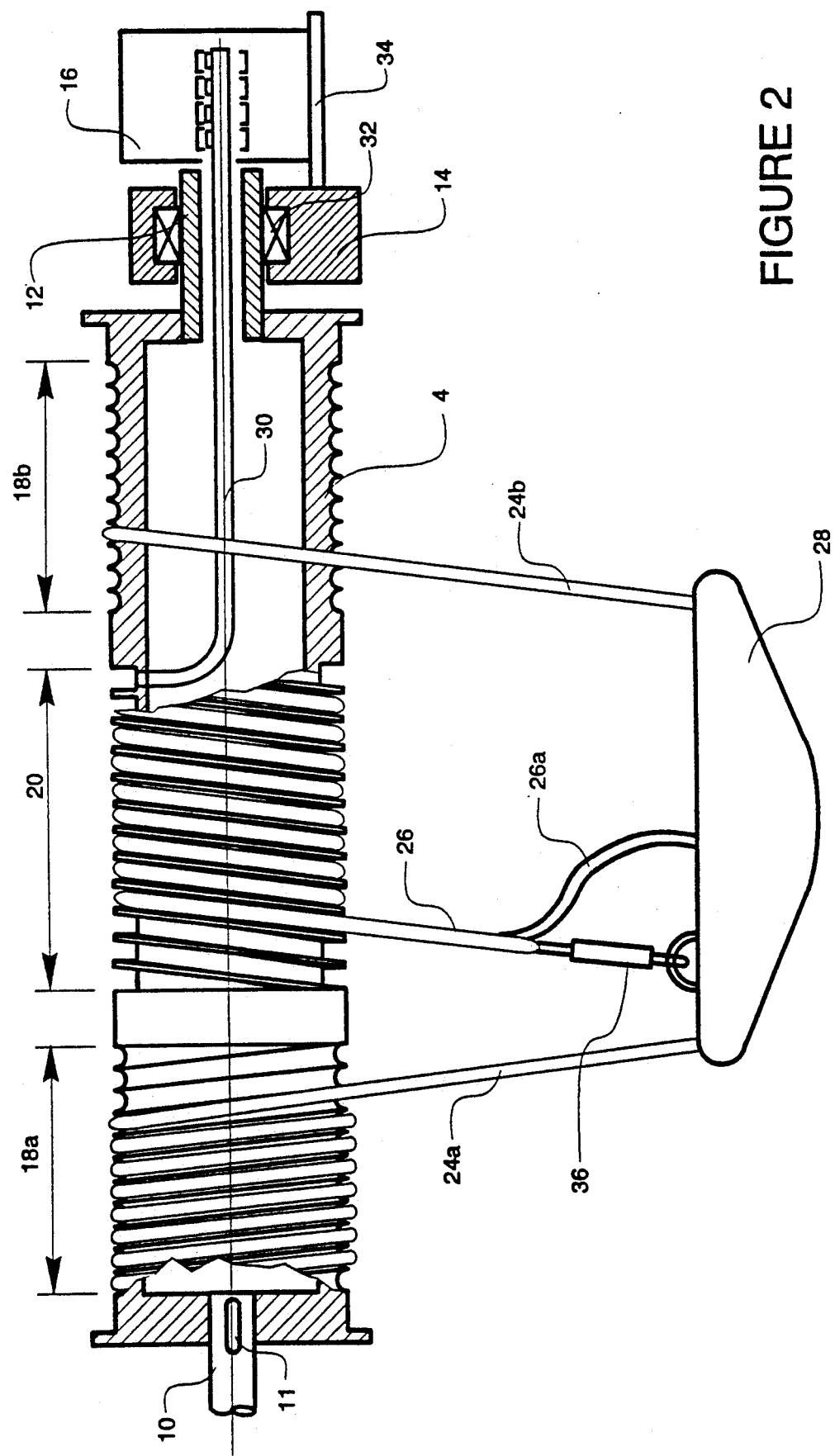
FIG. 2 is a longitudinal cross-sectional view illustrating a first embodiment of a hoisting system according to the invention.

FIG. 2 illustrates a longitudinal cross-section through a hoist drum according to a first embodiment of the invention. The drive shaft 10 is coupled to one end of the hoist drum 4 using, for example, a key 11 to facilitate transmission of torque from the gear box (not shown in FIG. 2) to the hoist drum 4. The opposite end of the hoist drum 4 is supported by the hollow shaft 12. In this embodiment, the hollow shaft 12 is fixedly attached to the hoist drum 4 by any appropriate means. The hollow shaft 12 is rotates in a conventional bearing 32 supported by the mounting block 14.

A cable guide 30 is disposed within the hoist drum 4 to provide support for the length of cable between the cable groove 20 and the slip-ring assembly 16. The cable guide can be composed of a hollow tube (for example made of steel), which communicates with the cable groove proximal to the cable attachment site (not shown). With this arrangement, the cable 26 extends upwards from the suspended device 28, winds around the hoist drum 4 within the cable groove 20, and is securely attached to the hoist drum 4 at the cable attachment site. Thereafter, the cable 26 passes through the wall of the hoist drum 4 and into the cable guide 30. The cable 26 then runs through the cable guide 30 and into the slip-ring assembly 16. As illustrated in FIG. 2, the slip-ring assembly 16 can conveniently be supported by a mounting bracket 34.

The slip-ring assembly 16 may be a commercially available type, such as, for example, a type FPb manufactured by Stemmann.

Figure 3:
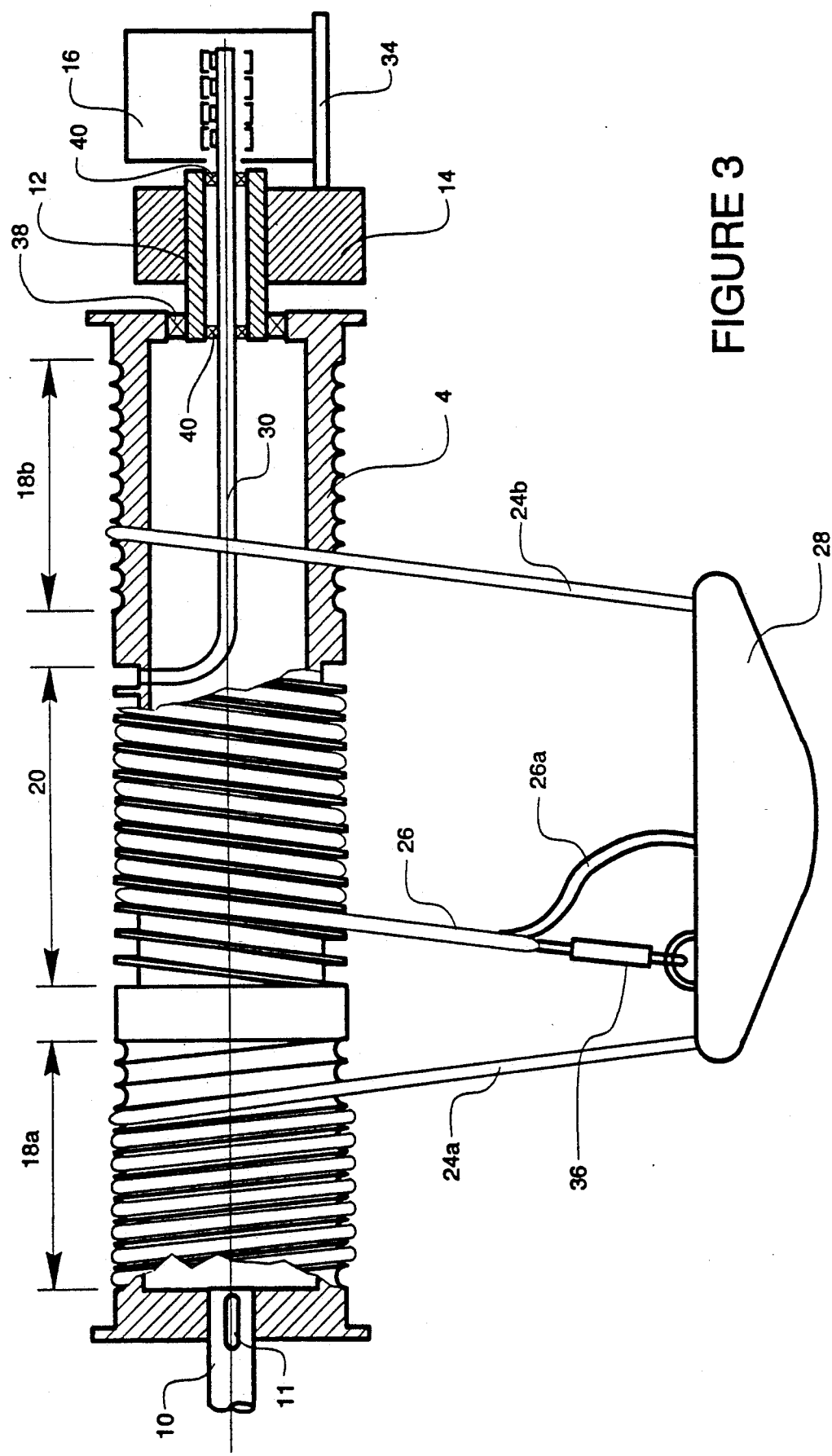
FIG. 3 is a longitudinal cross-sectional view illustrating a second embodiment of a hoisting system according to the invention.

FIG. 3 illustrates a second embodiment of the hoisting system of the invention. In this embodiment the hollow shaft 12 is mounted in the mounting block 14 in such a manner that it is substantially prevented from rotation. The hoisting drum 4 is supported by the hollow shaft 12 via a conventional bearing 38, which facilitates rotation of the hoist drum 4 with respect to the hollow shaft 12. The cable guide 30 is supported within the hollow shaft 12 by cable guide bearings 40, which are also of conventional construction. By this means, rotation of the cable guide 30 within the hollow shaft 12 is facilitated. Finally, the cable guide 30 can be coupled to the armature of the slip-ring assembly 16 to ensure that the armature rotates with the hoist drum 4.

Figure 4:
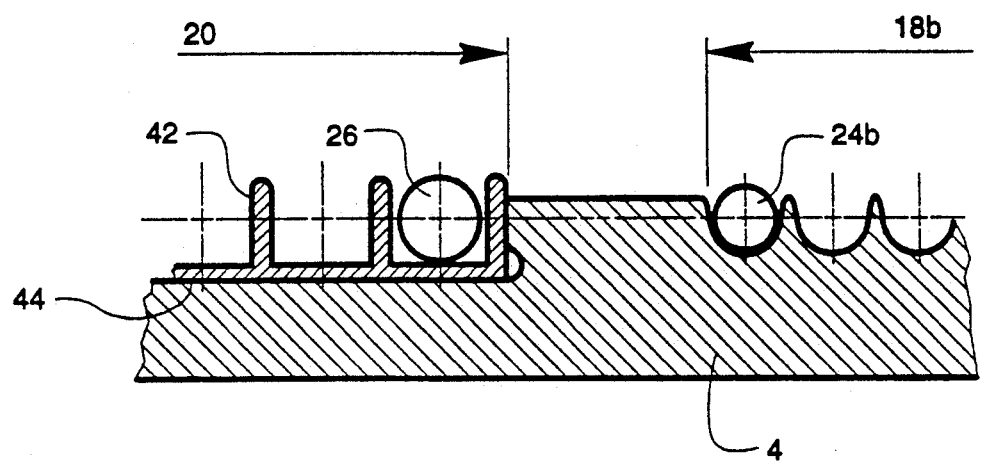
FIG. 4 is a partial longitudinal cross-sectional view illustrating an alternative embodiment of a hoisting drum comprised within a hoisting system according to the invention.

FIG. 4 illustrates an alternative embodiment of the hoisting drum. This embodiment may comprise either of the hoist drum bearing arrangements illustrated in FIGS. 2 and 3. In this case, the cable groove 20 is formed on a cylindrical cable frame 42. The cable frame 42 is mounted concentrically with the hoist drum 4, in a mounting recess 44. The difference in the diameter of the cable frame 42 and the hoist drum 4 can be used, for example, to compensate for differences in the cable diameter. By this means, the center of the cable 26 is maintained at the same radius from the hoist drum center as the hoisting ropes 24a and 24b, as illustrated in FIG. 4.

In this embodiment, the cable frame 42 can be composed of two or more semi-cylindrical sections, which are adapted to be fitted to the hoisting drum 4, thereby forming a cable frame 42 which completely surrounds the hoisting drum 4.

It will be apparent to those skilled in the art that there are many ways in which the above described embodiments may be varied without departing from the scope of the appended claims. For example, in the embodiment illustrated in FIG. 3, the cable guide 30 is used to rotate the armature of the slip-ring assembly 16. It is readily apparent, in this case, that the cable guide 30 may also be adapted to serve as the armature.

Figure 5A:
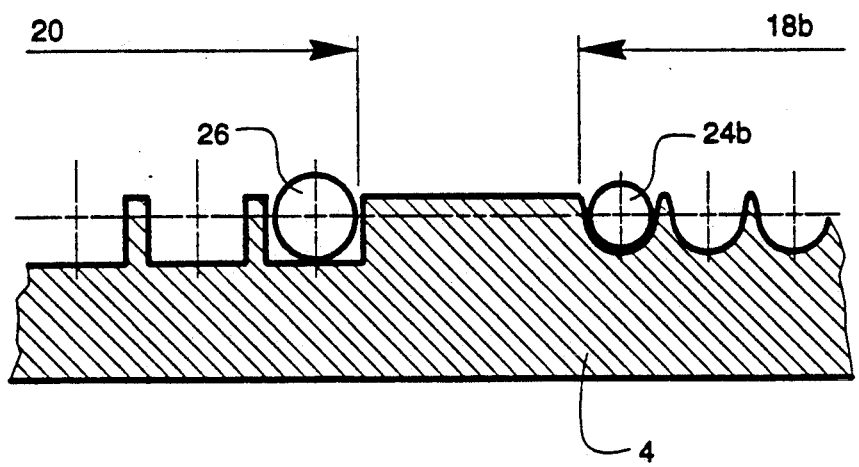
FIGS. 5a and 5b are partial longitudinal cross-sectional views illustrating further alternative embodiments of a hoist drum according to the invention.
Figure 5B:
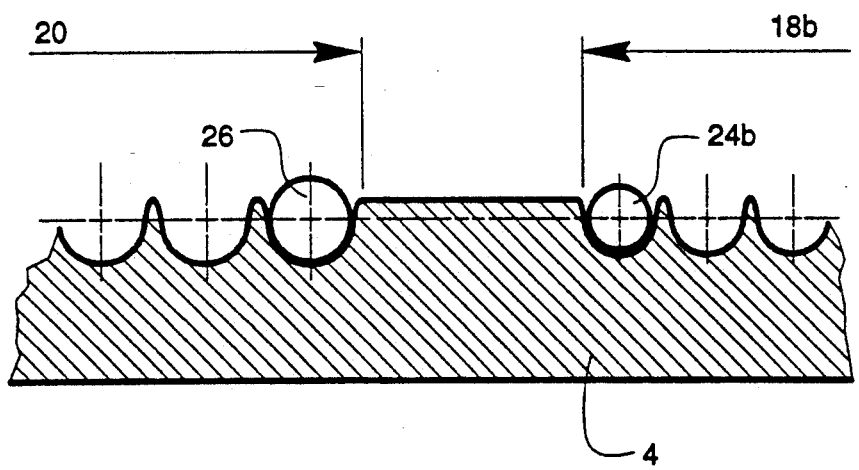

Furthermore, it will be understood that the cross sectional shape of the electrical cable groove can be substantially rectangular (as illustrated in FIG. 5a) or substantially semi-circular (as illustrated in FIG. 5b).

We claim:

1. A hoisting system for raising and lowering a suspended device, said hoisting system comprising:

a hoist drum comprising two hoist rope grooves located at opposite ends of said hoist drum, and further comprising an electrical cable groove located between said hoist rope grooves;

respective hoisting ropes at least partially disposed in said hoist rope grooves, one end of said hoist ropes being secured to said hoist drum, the other end of said hoist ropes extending down to and supporting said suspended devices;

an electrical cable at least partially disposed in said electrical cable groove, said electrical cable being secured to said hoist drum near one end of the electrical cable, said electrical cable extending down to said suspended device, so as to establish an electrical connection thereto;

a drive shaft coupled to one end of said hoist drum and to driving means to rotate said hoist drum in respective directions to raise and lower said suspended device, said drive shaft being further adapted to support said one end of said hoist drum;

a hollow shaft disposed at the other end of said hoist drum, said hollow shaft being adapted to support said other end of said hoist drum;

electrical cable guide means disposed within said hoist drum and communicating with said cable groove and said hollow shaft, whereby the portion of said electrical cable extending through said cable guide and said hollow shaft is supported and substantially protected against abrasion and mechanical stress; and coupling means disposed proximal to the open end of said hollow shaft for maintaining an electrical connection with said electrical cable substantially without interfering with rotation of the electrical cable with said hoist drum;

said hoist rope grooves and said electrical cable groove being so dimensioned that central axes of said hoist ropes and said electrical cable are maintained at a substantially equal radial distance from a central axis of said hoist drum.

2. A hoisting system as claimed in claim 1, wherein said coupling means is a slip-ring assembly.

3. A hoisting system as claimed in claim 1, wherein said electrical cable guide means comprises a hollow tube extending through said hollow shaft, said electrical cable guide means being supported concentrically with said hollow shaft by means of bearings.

4. A hoisting system as claimed in claim 1, wherein said hoisting rope grooves and said electrical cable groove are disposed in the exterior surface of said hoist drum.

5. A hoisting system as claimed in claim 1, wherein said electrical cable groove is formed on a separate cylindrical frame mounted concentrically with said hoist drum and fixed thereto.

6. A hoisting system as claimed in claim 5, wherein said separate cylindrical frame is composed of two or more semi-cylindrical shell sections and assembled onto the hoist drum to form the electrical cable groove.

7. A hoisting system as claimed in claim 1, wherein the cross sectional shape of said electrical cable groove is substantially semi-circular.

8. A hoisting system as claimed in claim 1, wherein the cross sectional shape of said electrical cable groove is substantially rectangular.

* * * * *